(12) United States Patent
Reddish et al.

(10) Patent No.: US 9,417,890 B2
(45) Date of Patent: Aug. 16, 2016

(54) COMPILATION OF TRANSFORMATION IN RECALCULATION USER INTERFACE

(71) Applicant: Microsoft Technology Licensing, LLC, Redmond, WA (US)

(72) Inventors: Andrew Douglas Reddish, Redmond, WA (US); Olivier Colle, Bellevue, WA (US); Radu B. Gruian, Sammamish, WA (US); Nizam Anuar, Snoqualmie, WA (US); Jaideep Sarkar, Redmond, WA (US); Vijay Mital, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 415 days.

(21) Appl. No.: 13/862,277

(22) Filed: Apr. 12, 2013

(65) Prior Publication Data

US 2014/0310697 A1 Oct. 16, 2014

(51) Int. Cl.
*G06F 9/45* (2006.01)
*G06F 9/44* (2006.01)
*G06F 17/24* (2006.01)

(52) U.S. Cl.
CPC ............ *G06F 9/4443* (2013.01); *G06F 17/246* (2013.01); *G06F 8/433* (2013.01)

(58) Field of Classification Search
CPC ....... G06F 9/4443; G06F 8/443; G06F 8/433; G06F 17/246
USPC .................................. 717/140, 144, 154–155
See application file for complete search history.

(56) References Cited

U.S. PATENT DOCUMENTS

| | | | | |
|---|---|---|---|---|
| 5,471,612 A | * | 11/1995 | Schlafly | ............... G06F 17/246 715/209 |
| 6,317,758 B1 | * | 11/2001 | Madsen et al. | ................. 715/220 |
| 6,460,059 B1 | * | 10/2002 | Wisniewski | .................. 715/212 |

(Continued)

FOREIGN PATENT DOCUMENTS

| | | |
|---|---|---|
| EP | 1367514 A1 | 12/2003 |
| WO | 2008107665 A2 | 9/2008 |

OTHER PUBLICATIONS

Sajaniemi et al., Goals and Plans in Spreadsheet Calculation, 1999, University of Joensu.*

(Continued)

*Primary Examiner* — Anna Deng
(74) *Attorney, Agent, or Firm* — Jessica Meyers; Fehmi Chebil; Micky Minhas

(57) ABSTRACT

The compilation of a transformation chain of a recalculation user interface that displays an electronic canvas that contains one or more displayed result of a transformation chain. The transformation chain includes transforms between a respective data source and data sink. User editing of the recalculation user interface could cause one or more of the transforms to be re-executed, thereby causing recalculation. The compilation involves analyzing the transformation chain of the recalculation user interface for dependencies to create a dependency graph of dependencies between entities. For instance, some dependencies might be between entities so as to indicate that if one entity is evaluated, then the other should be also. The dependency graph is then used to create a lower level of execution steps. The dependency graph is further provided to a runtime for the program, so that the dependency graph may be available during operation of the recalculation user interface.

24 Claims, 8 Drawing Sheets

(56) References Cited

U.S. PATENT DOCUMENTS

| | | | |
|---|---|---|---|
| 6,574,788 B1* | 6/2003 | Levine et al. | 716/102 |
| 6,883,161 B1* | 4/2005 | Chovin | G06F 8/34 715/740 |
| 7,984,371 B2* | 7/2011 | Zdenek | 715/212 |
| 8,352,397 B2 | 1/2013 | Rubin et al. | |
| 8,386,916 B2 | 2/2013 | Le Brazidec et al. | |
| 8,627,199 B1* | 1/2014 | Handley et al. | 715/234 |
| 9,037,961 B1* | 5/2015 | Mansell | 715/212 |
| 2006/0080594 A1* | 4/2006 | Chavoustie et al. | 715/503 |
| 2009/0292730 A1* | 11/2009 | Li et al. | 707/104.1 |
| 2011/0055681 A1 | 3/2011 | Smialek et al. | |
| 2011/0314365 A1 | 12/2011 | Messerly et al. | |

OTHER PUBLICATIONS

Wack, Partitioning Dependecy Graphs for Concurrent Execution: A Parallel Spreadsheet on a Realistically Modeled Message Passing Environment, Aug. 1995, University of Delaware.*

Francoeur, Joe, "Algorithms using Java for Spreadsheet Dependent Cell Recomputation", In arXiv Preprint cs/0301036, Jun. 9, 2003, 24 pages.

Wang, et al., "Matching Dependence-Related Queries in the System Dependence Graph", In 25th IEEE/ACM International Conference on Automated Software Engineering, Sep. 20, 2010, 10 pages.

Asuncion, Hazeline U., "SourceTrac: Tracing Data Sources within Spreadsheets", In Proceedings of the 4th International Conference on Provenance and Annotation of Data and Processes, Jun. 2012, 14 pages.

"International Search Report and Written Opinions Issued in PCT Application No. PCT/US2014/033708", Mailed Date: Feb. 25, 2015, 13 Pages.

Sestoft, Peter, "Spreadsheet Technology", In IT University Technical Report Series, Dec. 2011, 153 Pages.

Hamann, Jens Hammelsvang, "Parallelization of Spreadsheet Computations", In Master Thesis at IT-University of Copenhagen, May 2010, 94 Pages.

Botzer, et al., "Adi-Active Dependency Integration", Published on: Jun. 24, 2002 Available at: https://researchweb.watson.ibm.com/haifa/projects/software/adi/papers/ADI_V8.pdf.

Feiler, et al., "Propagator: A Family of Patterns", In Proceedings of Technology of Object-Oriented Languages and Systems, Jul. 28, 1997, pp. 355-366.

Nunez, et al., "Vissh: A Data Visualisation Spreadsheet", In Proceedings of the Joint Eurographics and IEEE TCVG Symposium on Visualization, Data Visualization, May 29, 2000, pp. 209-218.

"Second Written Opinion Issued in PCT Patent Application No. PCT/US2014/033708", Mailed Date: Jun. 24, 2015, 8 Pages.

"International Preliminary Report on Patentability Issued in PCT Application No. PCT/US2014/033708", Mailed Date: Sep. 14, 2015, 10 Pages.

* cited by examiner

COMPILATION OF TRANSFORMATION IN RECALCULATION USER INTERFACE

BACKGROUND

A "recalculation document" is an electronic document that shows various data sources and data sinks, and allows for a declarative transformation between a data source and a data sink. For any given set of transformations interconnecting various data sources and data sinks, the output of the data source may be consumed by the data sink, or the output of the data source may be subject to transformations prior to being consumed by the data sink. These various transformations are evaluated resulting in one or more outputs represented throughout the recalculation document.

The user can add and edit the declarative transformations without having in-depth knowledge of coding. Such editing automatically causes the transformations to be recalculated, causing a change in one of more outputs.

A specific example of a recalculation document is a spreadsheet document, which includes a grid of cells. Any given cell might include an expression that is evaluated to output a particular value that is displayed in the cell. The expression might refer to a data source, such as one or more other cells or values.

BRIEF SUMMARY

At least some embodiments described herein relate to the compilation of a transformation chain of a recalculation user interface. The transformation chain includes a declarative transforms between a respective data sources and data sinks. For instance, in the context of a spreadsheet, the data sink might be a particular spreadsheet cell, the transformation might be the expression associated with the particular cell, and the data source might be one or more other cells or particular values referenced within the expression. User editing of the recalculation user interface could cause one or more of the transforms to be re-executed, thereby causing recalculation.

The compilation involves analyzing the transformation chain of the recalculation user interface for dependencies to create a dependency graph of dependencies between entities. For instance, some dependencies might be between entities so as to indicate that if one entity is evaluated, then the other should be also. Other dependencies might specify user events upon which the evaluation of an entity depends. The dependency graph is then used to create a lower level of execution steps. The dependency graph is further provided to a runtime for the program, so that the dependency graph may be available during operation of the recalculation user interface.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the compilation of a transformation chain of a recalculation user interface. The recalculation user interface might be, for example, a recalculation document, such as a spreadsheet. However, the recalculation user interface may be any displayed electronic canvas that includes one or more displayed results of a transformation chain. The transformation chain includes a plurality of transforms between a respective data source and data sink. User editing of the recalculation user interface could cause one or more of the transforms to be re-executed, thereby causing recalculation.

The compilation involves analyzing the transformation chain of the recalculation user interface for dependencies to create a dependency graph of dependencies between entities. For instance, some dependencies might be between entities so as to indicate that if one entity is evaluated, then the other should be also. The dependency graph is then used to create a lower level of execution steps. The dependency graph is further provided to a runtime for the program, so that the dependency graph may be available during operation of the recalculation user interface.

Some introductory discussion of a computing system will be described with respect to FIG. 1. Then, the compiling of the transformation chain of the recalculation user interface will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
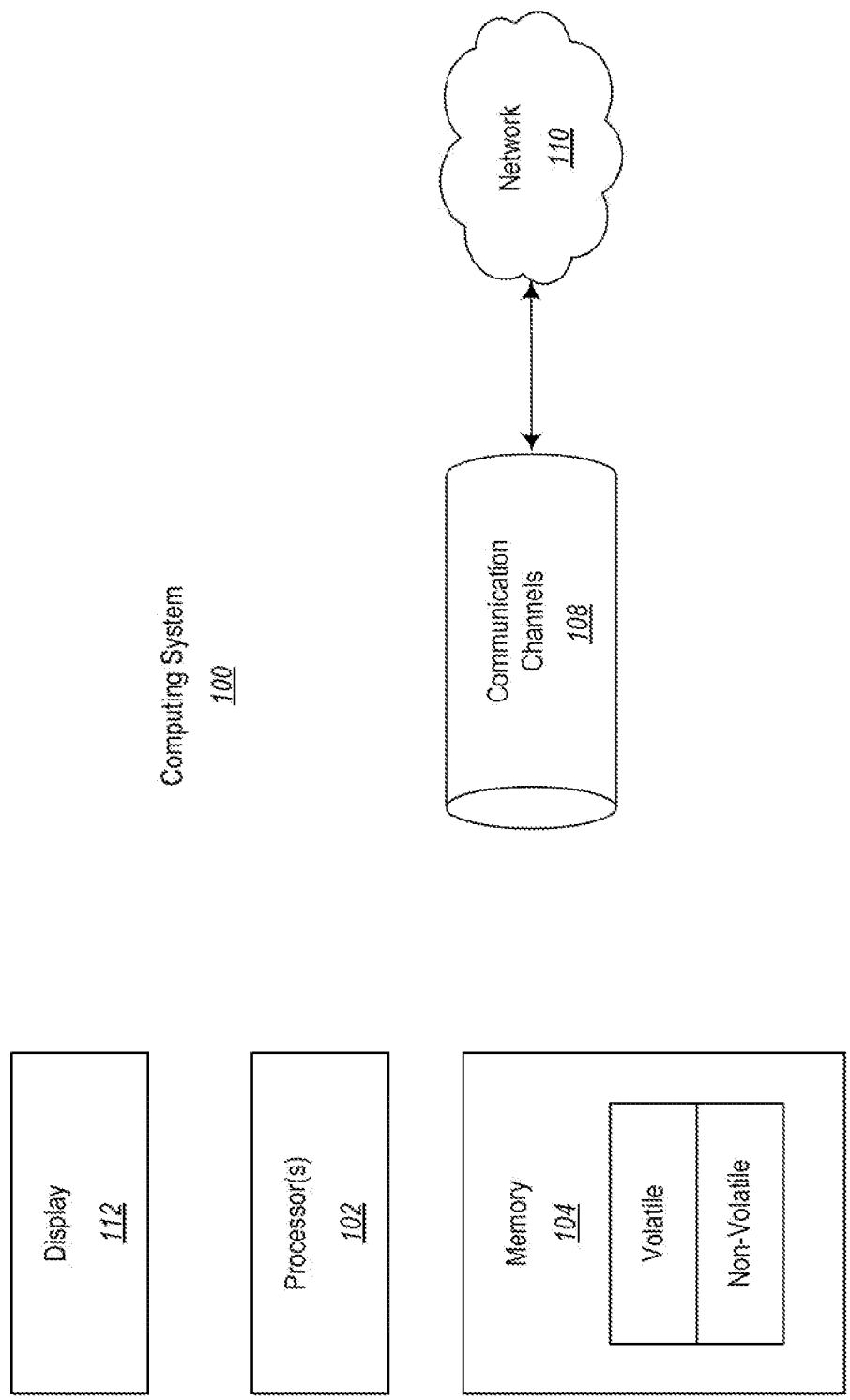
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display 112, which may be used to display visual representations to a user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the claims, a "recalculation user interface" is an interface with which a user may interact and which occurs in an environment in which there are one or more data sources and one or more data sinks. Furthermore, there is a set of transformations that may each be declaratively defined between one or more data sources and a data sink. For instance, the output of one data source is fed into the transformation, and the result from the transformation is then provided to the data sink, resulting in potentially some kind of change in visualization to the user.

The transformations are "declarative" in the sense that a user without specific coding knowledge can write the declarations that define the transformation. As the transformation is declaratively defined, a user may change the declarative transformation. In response, a recalculation is performed, resulting in perhaps different data being provided to the data sinks.

A classic example of a recalculation user interface is a spreadsheet document. A spreadsheet document includes a grid of cells. Initially, the cells are empty, and thus any cell of the spreadsheet program has the potential to be a data source or a data sink, depending on the meaning and context of declarative expressions inputted by a user. For instance, a user might select a given cell, and type an expression into that cell. The expression might be as simple as an expressed scalar value to be assigned to that cell. That cell may later be used as a data source. Alternatively, the expression for a given cell might be in the form of an equation in which input values are taken from one or more other cells. In that case, the given cell is a data sink that displays the result of the transformation. However, during continued authoring, that cell may be used as a data sink for yet other transformations declaratively made by the author.

The author of a spreadsheet document need not be an expert on imperative code. The author is simply making declarations that define a transformation, and selecting corresponding data sinks and data sources. FIGS. 5 through 9 described hereinafter provide a more generalized declarative authoring environment in which a more generalized recalculation user interface is described. In that subsequently described environment, visualized controls may serve as both data sources and data sinks. Furthermore, the declarative transformations may be more intuitively authored by simple manipulations of those controls.

Figure 2:
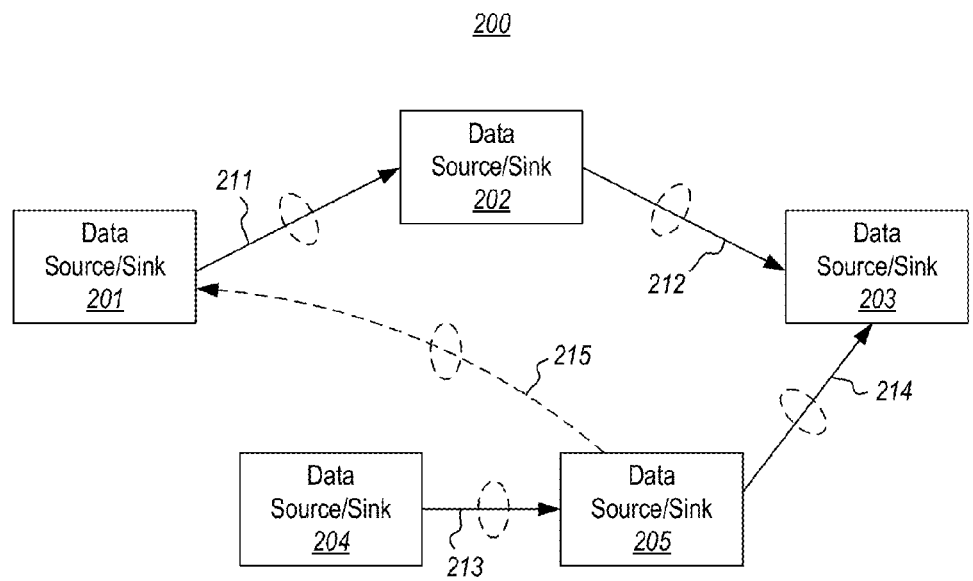
FIG. 2 abstractly illustrates an example recalculation user interface, which illustrates several data sources and data sinks with intervening transforms, and is used as a specific example provided to explain the broader principles described herein.

FIG. 2 abstractly illustrates an example recalculation user interface 200, which is a specific example provided to explain the broader principles described herein. The recalculation user interface 200 is just an example as the principles describe herein may be applied to any recalculation user interface to create a countless variety of recalculation user interfaces for a countless variety of applications.

The recalculation user interface 200 includes several declarative transformations 211 through 215. The dashed circle around each of the arrows representing the transformations 211 through 215 symbolizes that the transformations are each in declarative form.

In this specific example of FIG. 2, the transform 211 includes respective data source 201 and data sink 202. Note that a data sink for one transform may also be a data source for another transform. For instance, data sink 202 for transform 211 also serves as a data source for the transform 212. Furthermore, a transform may have multiple data sources. Thus, the transform chain can be made hierarchical, and thus quite complex. For instance, the transform 212 includes data source 202 and data sink 203. The data sink 203 includes two data sources; namely data source 202 for transform 212, and data source 205 for transform 214. That said, perhaps a single transform leads the two data sources 202 and 205 into the data sink 203. The transform 213 includes a data source 204 and a data sink 205.

If the recalculation user interface were a spreadsheet document, for example, the various data sources/sinks 201 through 205 might be spreadsheet cells, in which case the transforms represent the expression that would be associated with each data sink. The output of each expression is displayed within the cell. Thus, in the case of a spreadsheet, the data sources/sinks might be complex visualized controls that include both input parameters to and output parameters from the transformation chain. For instance, in FIG. 2, there is an additional declarative transformation 215 that leads from data source 205 into data sink 201. Thus, the data source/sink 201 might visualize information representing an output from transform 215, as well as provide further data to other data sinks.

Recalculation user interfaces do not need to have visualization controls. One example of this is a recalculation user interface meant to perform a transformation-based computation, consuming source data and updating sink data, with no information displayed to the user about the computation in the normal case. For instance, the recalculation user interface might support a background computation. A second example is a recalculation user interface that has output controls that operate external actuators, such as the valves in a process control example. Such controls are like display controls in that their states are controlled by results of the transformation computation and on signal inputs. However, here, the output is a control signal to a device rather than a visualization to a display. Consider, for example, a recalculation user interface for controlling a robot. This recalculation user interface might have rules for robot actions and behavior that depend on robot sensor inputs like servo positions and speeds, ultrasonic range-finding measurements, and so forth. Or consider a process control application based on a recalculation user interface that takes signals from equipment sensors like valve positions, fluid flow rates, and so forth.

Figure 3:
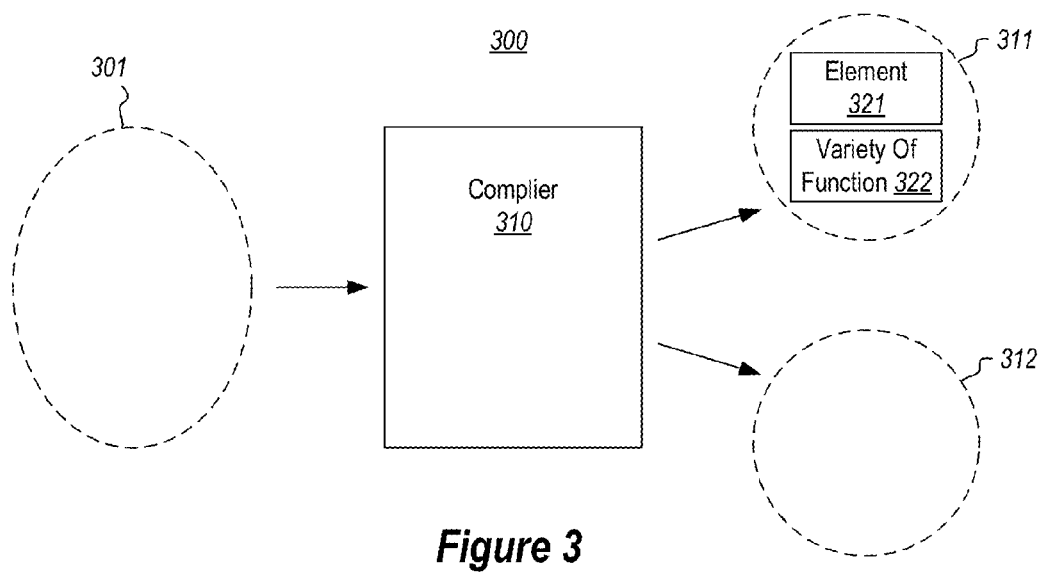
FIG. 3 illustrates an example compilation environment that includes a compiler that accesses the transformation chain and produces compiled code as well as a dependency chain.
Figure 4:
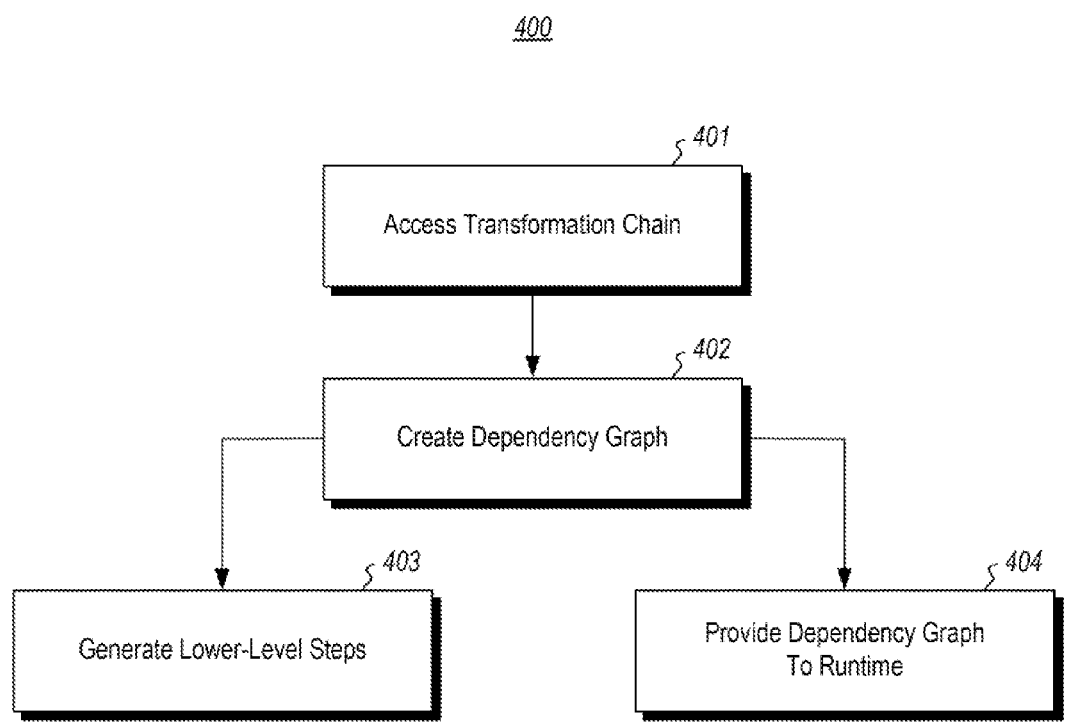
FIG. 4 illustrates a flowchart of a method for compiling a transformation chain of a recalculation user interface.

FIG. 3 illustrates an example compilation environment 300 that includes a compiler 310 that accesses the transformation chain 301. An example, of the transformation chain 301 is the recalculation user interface 200 of FIG. 2. FIG. 4 illustrates a flowchart of a method 400 for compiling a transformation chain of a recalculation user interface. The method 400 may be performed by the compiler 310 of FIG. 3. In one embodiment, the method 400 may be performed by the computing system 100 in response to the processor(s) 102 executing computer-executable instructions embodied on one or more computer-readable storage media.

The method 400 includes analyzing a transformation chain of the recalculation user interface for dependencies (act 401). For instance, referring to FIG. 2, the compiler 300 might analyze each of the transformations 211 through 215. The transformations are declarative and thus the dependencies can be extracted more easily than they could if the transformations were expressed using an imperative computer language.

Based on the analysis, a dependency graph is created (act 402) between entities referenced in the transformations. Essentially, the dependencies have a source entity that represents an event, and a target entity that represents that the evaluation of that target entity depends on the event. An example of the event might be a user event in which the user interacts in a certain way with the recalculation user interface. As another example, the event might be an inter-entity event in which if the source entity is evaluated, then the target entity of the dependency should also be evaluated.

The compiler then creates lower-level execution steps based on the dependency graph (act 403). The lower-level execution steps might be, for instance, imperative language code. Imperative language code is adapted to respond to detect events, reference an event chart to determine a function to execute, and execute that function. Accordingly, each of the dependencies in the dependency graph may be reduced to a function. The dependency graph itself may be provided to the runtime (act 404). The imperative language code may be, for example, a script language, such as JAVASCRIPT. However, the principles described herein are not limited to the imperative language code being of any particular language.

As an example, FIG. 3 illustrates that the compiler 310 generates lower-level code 311 as well. Such lower level code 311 includes a compilation of each of the transformations in the transformation chain. For instance, lower level code 311 is illustrated as including element 321 representing the compilation of each of the transformations in the transformation chain. In the context of FIG. 2, the element 321 would include a compilation of each of the transformations 211 through 215. The lower level code 311 also includes a variety of functions 322. A function is generated for each dependency in the dependency graph. The functions may be imperative language functions.

When the imperative language runtime detects an event that is listed in the dependency graph, the corresponding function within the compiled functions 322 is also executed. Accordingly, with all transformations being properly compiled, and with each of the dependencies on particular events being enforced by dedicated functions, the declarative recalculation user interface is properly represented as an imperative language code.

Accordingly, an effective mechanism has been described for compiling a declarative recalculation user interface. In addition, the runtime is provided with a dependency graph, rather than a more extensive interpreter.

A specific example of an authoring pipeline for allowing non-programmers to author programs having complex behaviors using a recalculation user interface will now be described with respect to FIGS. 5 through 9.

Figure 5:
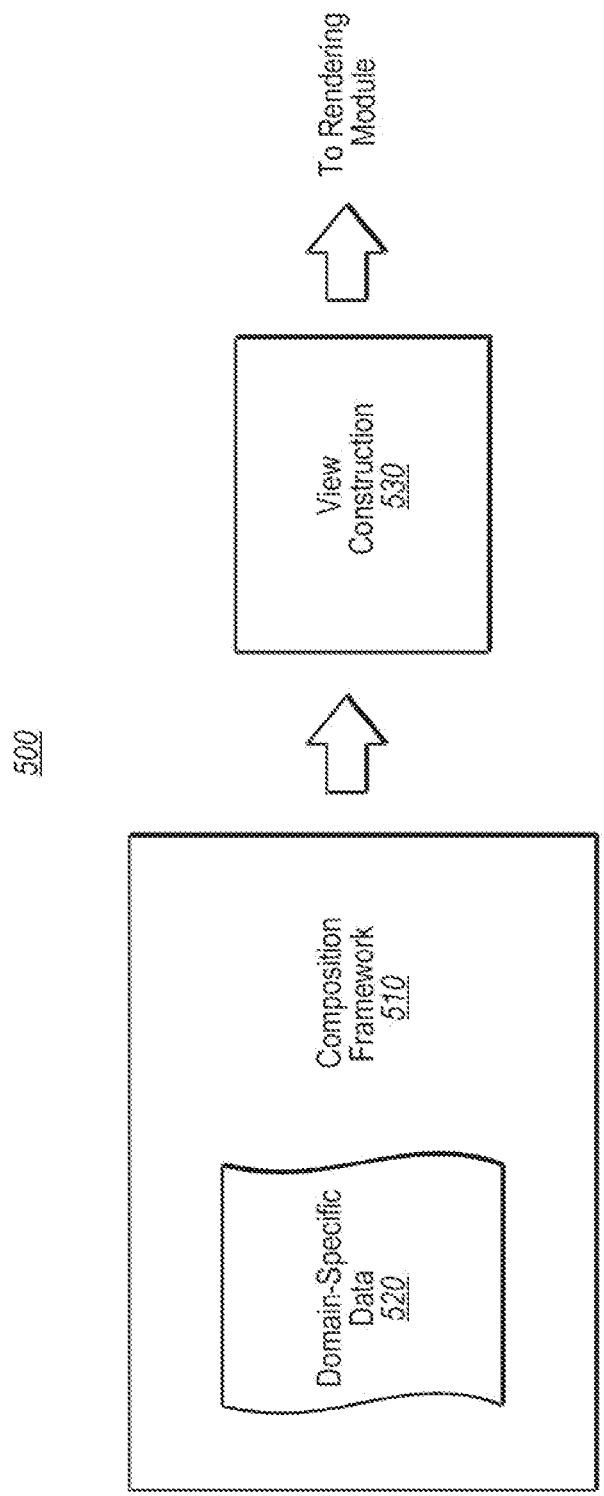
FIG. 5 illustrates an environment in which the principles of the present invention may be employed including a data-driven composition framework that constructs a view composition that depends on input data.

FIG. 5 illustrates a visual composition environment 500 that may be used to construct an interactive visual composition in the form of a recalculation user interface. The construction of the recalculation user interface is performed using data-driven analytics and visualization of the analytical results. The environment 500 includes a composition framework 510 that performs logic that is performed independent of the problem-domain of the view composition 530. For instance, the same composition framework 510 may be used to compose interactive view compositions for city plans, molecular models, grocery shelf layouts, machine performance or assembly analysis, or other domain-specific renderings.

The composition framework 510 uses domain-specific data 520, however, to construct the actual visual composition 530 that is specific to the domain. Accordingly, the same composition framework 510 may be used to generate recalculation user interfaces for any number of different domains by changing the domain-specific data 520, rather than having to recode the composition framework 510 itself. Thus, the composition framework 510 of the pipeline 500 may apply to a potentially unlimited number of problem domains, or at least to a wide variety of problem domains, by altering data, rather than recoding and recompiling. The view composition 530 may then be supplied as instructions to an appropriate 2-D or 3-D rendering module. The architecture described herein also allows for convenient incorporation of pre-existing view composition models as building blocks to new view composition models. In one embodiment, multiple view compositions may be included in an integrated view composition to allow for easy comparison between two possible solutions to a model.

Figure 6:
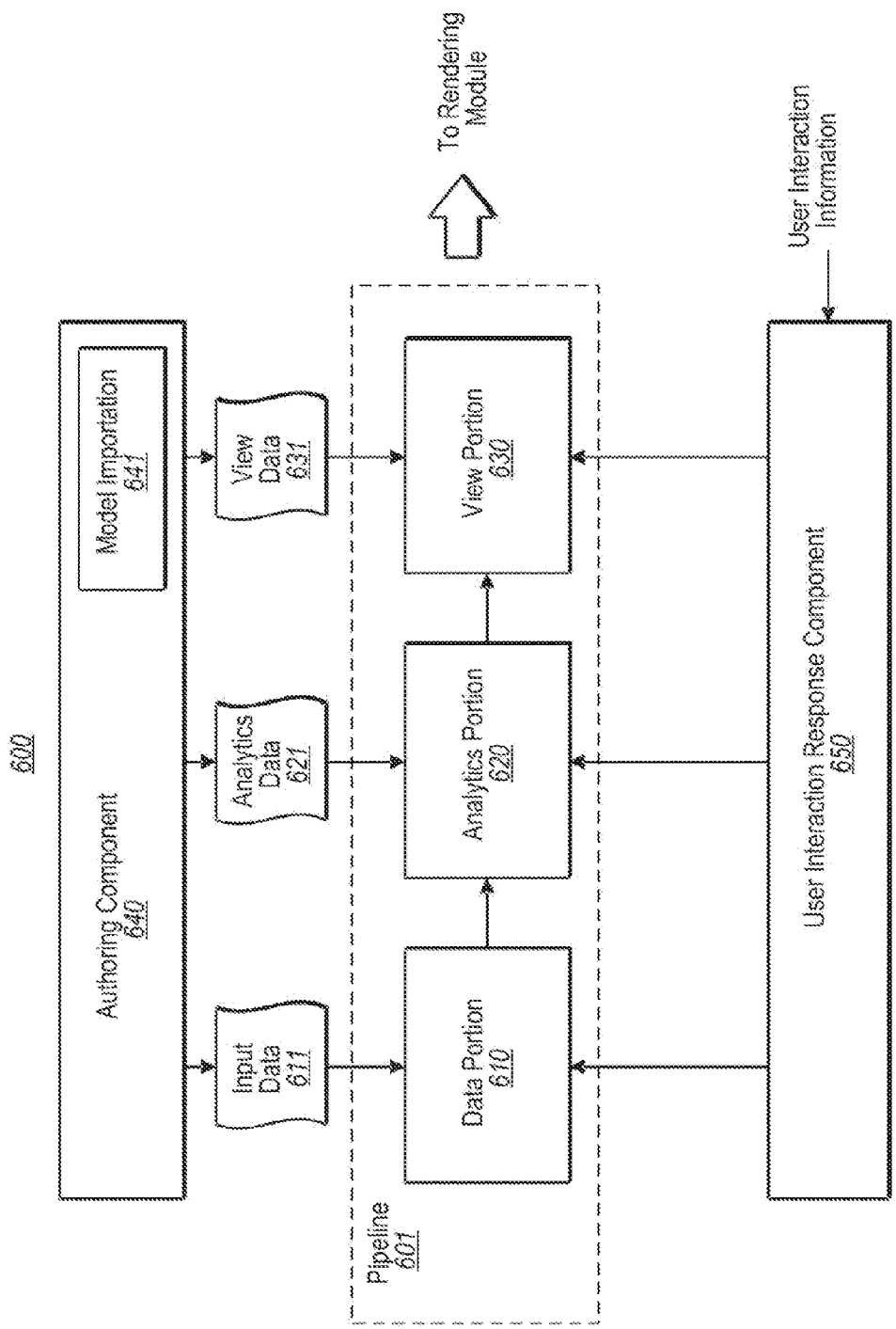
FIG. 6 illustrates a pipeline environment that represents one example of the environment of FIG. 5.

FIG. 6 illustrates an example architecture of the composition framework 510 in the form of a pipeline environment 600. The pipeline environment 600 includes, amongst other things, the pipeline 601 itself. The pipeline 601 includes a data portion 610, an analytics portion 620, and a view portion 630, which will each be described in detail with respect to subsequent FIGS. 7 through 9, respectively, and the accompanying description. For now, at a general level, the data portion 610 of the pipeline 601 may accept a variety of different types of data and presents that data in a canonical form to the analytics portion 620 of the pipeline 601. The analytics portion 620 binds the data to various model parameters, and solves for the unknowns in the model parameters using model analytics. The various parameter values are then provided to the view portion 630, which constructs the composite view using those values of the model parameters.

The pipeline environment 600 also includes an authoring component 640 that allows an author or other user of the pipeline 601 to formulate and/or select data to provide to the pipeline 601. For instance, the authoring component 640 may be used to supply data to each of data portion 610 (represented by input data 611), analytics portion 620 (represented by analytics data 621), and view portion 630 (represented by view data 631). The various data 611, 621 and 631 represent an example of the domain-specific data 520 of FIG. 5, and will be described in much further detail hereinafter. The authoring component 640 supports the providing of a wide variety of data including for example, data schemas, actual data to be used by the model, the location or range of possible locations of data that is to be brought in from external sources, visual (graphical or animation) objects, user interface interactions that can be performed on a visual, modeling statements (e.g., views, equations, constraints), bindings, and so forth. In one embodiment, the authoring component is but one portion of the functionality provided by an overall manager component (not shown in FIG. 6, but represented by the composition framework 510 of FIG. 5). The manager is an overall director that controls and sequences the operation of all the other components (such as data connectors, solvers, viewers, and so forth) in response to events (such as user interaction events, external data events, and events from any of the other components such as the solvers, the operating system, and so forth).

In the pipeline environment 600 of FIG. 6, the authoring component 640 is used to provide data to an existing pipeline 601, where it is the data that drives the entire process from defining the input data, to defining the analytical model (referred to above as the "transformation chain"), to defining how the results of the transformation chain are visualized in the view composition. Accordingly, one need not perform any coding in order to adapt the pipeline 601 to any one of a wide variety of domains and problems. Only the data provided to the pipeline 601 is what is to change in order to apply the pipeline 601 to visualize a different view composition either from a different problem domain altogether, or to perhaps adjust the problem solving for an existing domain. Further, since the data can be changed at use time (i.e., run time), as well as at author time, the model can be modified and/or extended at runtime. Thus, there is less, if any, distinction between authoring a model and running the model. Because all authoring involves editing data items and because the software runs all of its behavior from data, every change to data immediately affects behavior without the need for recoding and recompilation.

The pipeline environment 600 also includes a user interaction response module 650 that detects when a user has interacted with the displayed view composition, and then determines what to do in response. For example, some types of interactions might require no change in the data provided to the pipeline 601 and thus require no change to the view composition. Other types of interactions may change one or more of the data 611, 621, or 631. In that case, this new or modified data may cause new input data to be provided to the data portion 610, might require a reanalysis of the input data by the analytics portion 620, and/or might require a re-visualization of the view composition by the view portion 630.

Accordingly, the pipeline 601 may be used to extend data-driven analytical visualizations to perhaps an unlimited number of problem domains, or at least to a wide variety of problem domains. Furthermore, one need not be a programmer to alter the view composition to address a wide variety of problems. Each of the data portion 610, the analytics portion 620 and the view portion 630 of the pipeline 601 will now be described with respect to respective data portion 700 of FIG. 7, the analytics portion 800 of FIG. 8, and the view portion 900 of FIG. 9, in that order. As will be apparent from FIGS. 7 through 9, the pipeline 601 may be constructed as a series of transformation component where they each 1) receive some appropriate input data, 2) perform some action in response to that input data (such as performing a transformation on the input data), and 3) output data which then serves as input data to the next transformation component.

Figure 7:
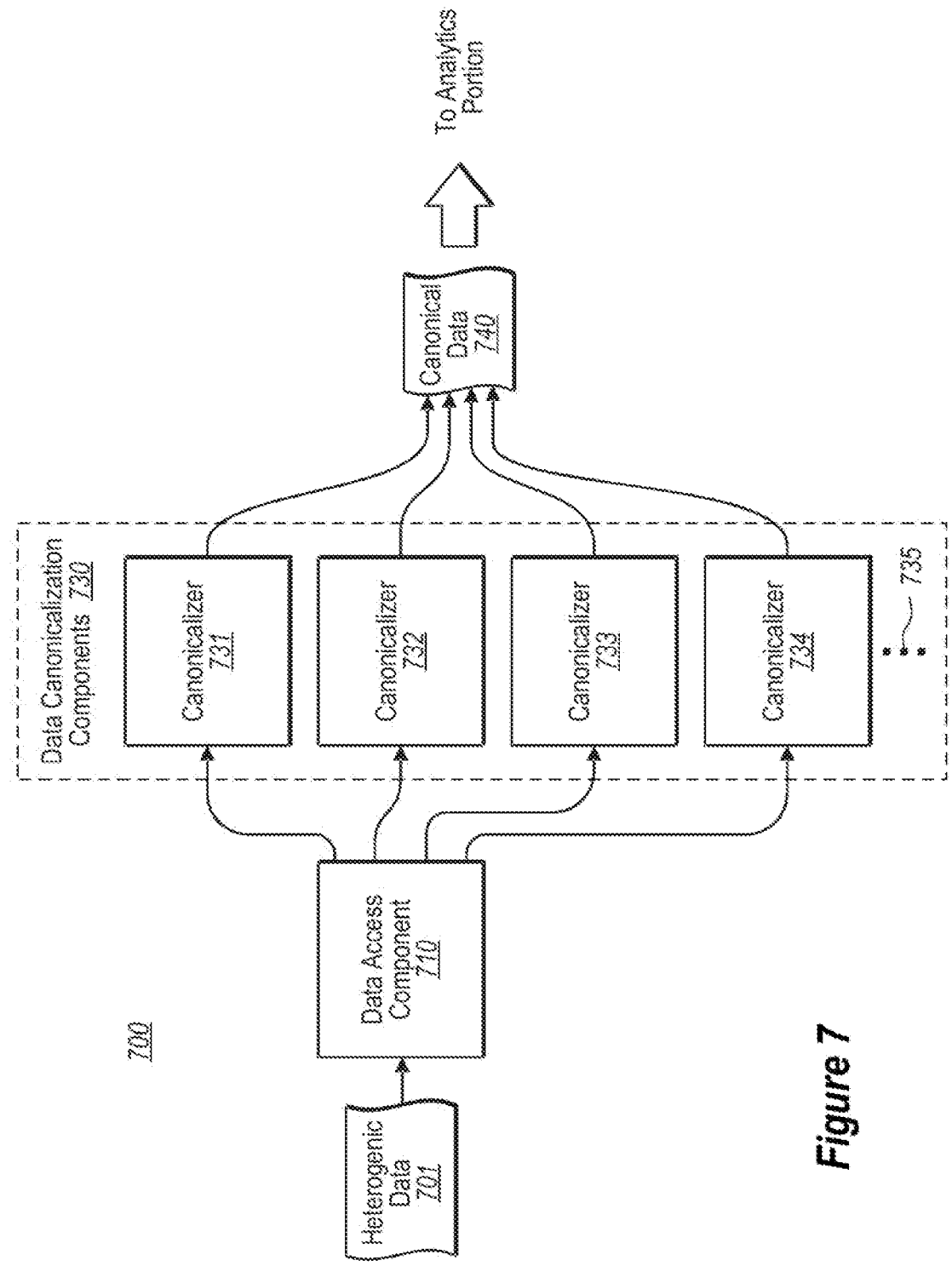
FIG. 7 schematically illustrates an embodiment of the data portion of the pipeline of FIG. 6.

FIG. 7 illustrates just one of many possible embodiments of a data portion 700 of the pipeline 601 of FIG. 6. One of the functions of the data portion 700 is to provide data in a canonical format that is consistent with schemas understood by the analytics portion 800 of the pipeline discussed with respect to FIG. 8. The data portion includes a data access component 710 that accesses the heterogenic data 701. The input data 701 may be "heterogenic" in the sense that the data may (but need not) be presented to the data access component 710 in a canonical form. In fact, the data portion 700 is structured such that the heterogenic data could be of a wide variety of formats. Examples of different kinds of domain data that can be accessed and operated on by models include text and XML documents, tables, lists, hierarchies (trees), SQL database query results, BI (business intelligence) cube query results, graphical information such as 2D drawings and 3D visual models in various formats, and combinations thereof (i.e, a composite). Further, the kind of data that can be accessed can be extended declaratively, by providing a definition (e.g., a schema) for the data to be accessed. Accordingly, the data portion 700 permits a wide variety of heterogenic input into the model, and also supports runtime, declarative extension of accessible data types.

In one embodiment, the data access portion 700 includes a number of connectors for obtaining data from a number of different data sources. Since one of the primary functions of the connector is to place corresponding data into canonical form, such connectors will often be referred to hereinafter and in the drawings as "canonicalizers". Each canonicalizer might have an understanding of the specific Application Program Interfaces (API's) of its corresponding data source. The canonicalizer might also include the corresponding logic for interfacing with that corresponding API to read and/or write data from and to the data source. Thus, canonicalizers bridge between external data sources and the memory image of the data.

The data access component 710 evaluates the input data 701. If the input data is already canonical and thus processable by the analytics portion 800, then the input data may be directly provided as canonical data 740 to be input to the analytics portion 800.

However, if the input data 701 is not canonical, then the appropriate data canonicalization component 730 is able to convert the input data 701 into the canonical format. The data canonicalization components 730 are actually a collection of data canonicalization components 730, each capable of converting input data having particular characteristics into canonical form. The collection of canonicalization components 730 is illustrated as including four canonicalization components 731, 732, 733 and 734. However, the ellipses 735 represents that there may be other numbers of canonicalization components as well, perhaps even fewer that the four illustrated.

The input data 701 may even include a canonicalizer itself as well as an identification of correlated data characteristic(s). The data portion 700 may then register the correlated data characteristics, and provide the canonicalization component to the data canonicalization component collection 730, where it may be added to the available canonicalization components. If input data is later received that has those correlated characteristics, the data access component 710 may then assign the input data to the correlated canonicalization component. Canonicalization components can also be found dynamically from external sources, such as from defined component libraries on the web. For example, if the schema for a given data source is known but the needed canonicalizer is not present, the canonicalizer can be located from an external component library, provided such a library can be found and contains the needed components. The pipeline might also parse data for which no schema is yet known and compare parse results versus schema information in known component libraries to attempt a dynamic determination of the type of the data, and thus to locate the needed canonicalizer components.

Alternatively, instead of the input data including all of the canonicalization component, the input data may instead provide a transformation definition defining canonicalization transformations. The collection 730 may then be configured to convert that transformations definition into a corresponding canonicalization component that enforces the transformations along with zero or more standard default canonicalization transformation. This represents an example of a case in which the data portion 700 consumes the input data and does not provide corresponding canonicalized data further down the pipeline. In perhaps most cases, however, the input data 701 results in corresponding canonicalized data 740 being generated.

In one embodiment, the data access component 710 may be configured to assign input data to the data canonicalization component on the basis of a file type and/or format type of the input data. Other characteristics might include, for example, a source of the input data. A default canonicalization component may be assigned to input data that does not have a designated corresponding canonicalization component. The default canonicalization component may apply a set of rules to attempt to canonicalize the input data. If the default canonicalization component is not able to canonicalize the data, the default canonicalization component might trigger the authoring component 540 of FIG. 5 to prompt the user to provide a schema definition for the input data. If a schema definition does not already exist, the authoring component 540 might present a schema definition assistant to help the author generate a corresponding schema definition that may be used to transform the input data into canonical form. Once the data is in canonical form, the schema that accompanies the data provides sufficient description of the data that the rest of the pipeline 601 does not need new code to interpret the data. Instead, the pipeline 601 includes code that is able to interpret data in light of any schema that is expressible as an accessible schema declaration language.

Regardless, canonical data 740 is provided as output data from the data portion 700 and as input data to the analytics portion 800. The canonical data might include fields that include a variety of data types. For instance, the fields might includes simple data types such as integers, floating point numbers, strings, vectors, arrays, collections, hierarchical structures, text, XML documents, tables, lists, SQL database query results, BI (business intelligence) cube query results, graphical information such as 2D drawings and 3D visual models in various formats, or even complex combinations of these various data types. As another advantage, the canonicalization process is able to canonicalize a wide variety of input data. Furthermore, the variety of input data that the data portion 700 is able to accept is expandable. This is helpful in the case where multiple models are combined as will be discussed later in this description.

Figure 8:
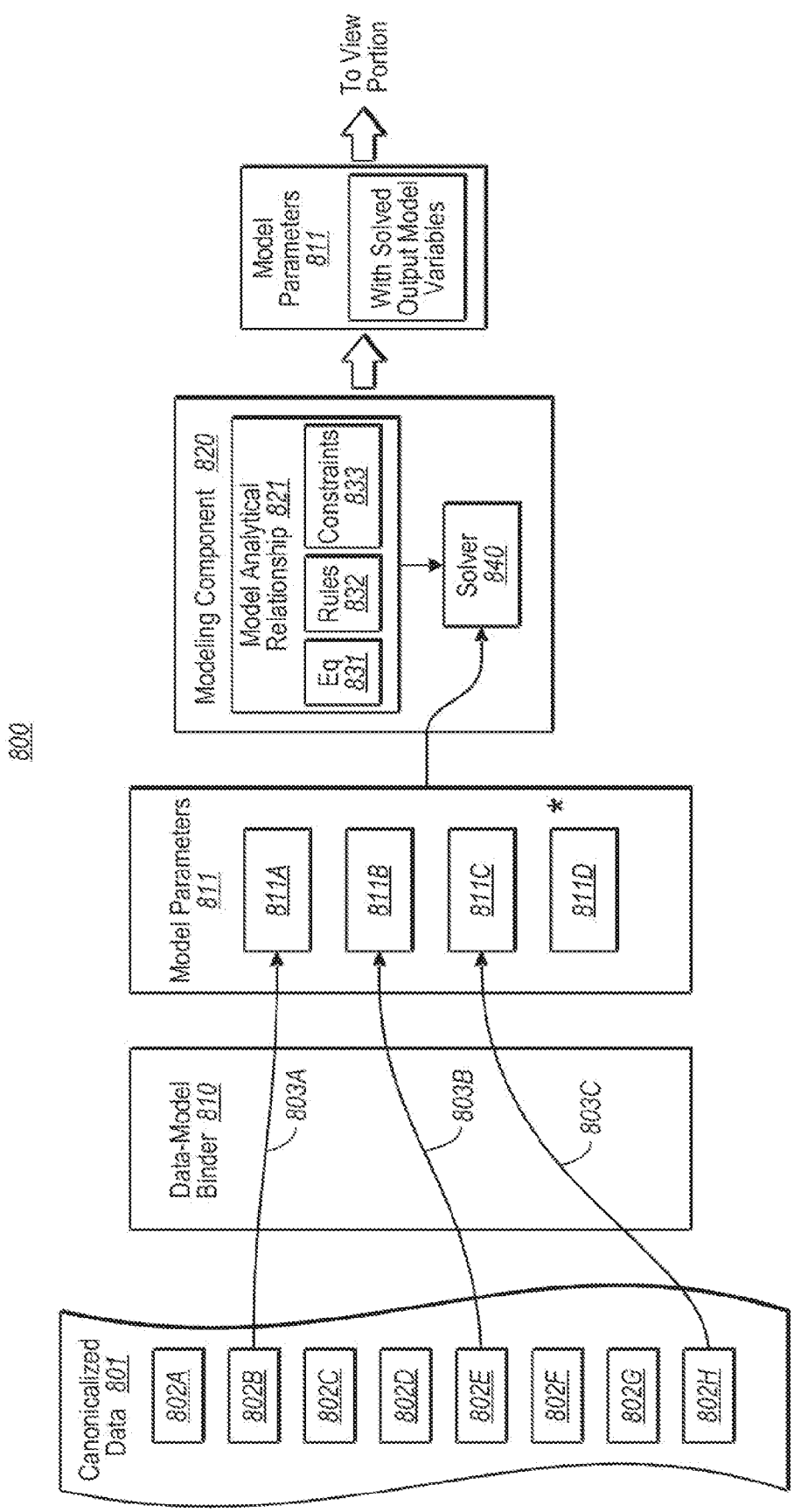
FIG. 8 schematically illustrates an embodiment of the analytics portion of the pipeline of FIG. 6.

FIG. 8 illustrates analytics portion 800 which represents an example of the analytics portion 620 of the pipeline 601 of FIG. 6. The data portion 700 provided the canonicalized data

801 to the data-model binding component 810. While the canonicalized data 801 might have any canonicalized form, and any number of parameters, where the form and number of parameters might even differ from one piece of input data to another. For purposes of discussion, however, the canonical data 801 has fields 802A through 802H, which may collectively be referred to herein as "fields 802".

On the other hand, the analytics portion 800 includes a number of model parameters 811. The type and number of model parameters may differ according to the model. However, for purposes of discussion of a particular example, the model parameters 811 will be discussed as including model parameters 811A, 811B, 811C and 811D. In one embodiment, the identity of the model parameters, and the analytical relationships between the model parameters may be declaratively defined without using imperative coding.

A data-model binding component 810 intercedes between the canonicalized data fields 802 and the model parameters 811 to thereby provide bindings between the fields. In this case, the data field 802B is bound to model parameter 811A as represented by arrow 803A. In other words, the value from data field 802B is used to populate the model parameter 811A. Also, in this example, the data field 802E is bound to model parameter 811B (as represented by arrow 803B), and data field 802H is bound to model parameter 811C (as represented by arrow 803C).

The data fields 802A, 802C, 802D, 802F and 802G are not shown bound to any of the model parameters. This is to emphasize that not all of the data fields from input data are always required to be used as model parameters. In one embodiment, one or more of these data fields may be used to provide instructions to the data-model binding component 810 on which fields from the canonicalized data (for this canonicalized data or perhaps any future similar canonicalized data) are to be bound to which model parameter. This represents an example of the kind of analytics data 621 that may be provided to the analytics portion 620 of FIG. 6. The definition of which data fields from the canonicalized data are bound to which model parameters may be formulated in a number of ways. For instance, the bindings may be 1) explicitly set by the author at authoring time, 2) explicit set by the user at use time (subject to any restrictions imposed by the author), 3) automatic binding by the authoring component 640 based on algorithmic heuristics, and/or 4) prompting by the authoring component of the author and/or user to specify a binding when it is determined that a binding cannot be made algorithmically. Thus bindings may also be resolved as part of the model logic itself.

The ability of an author to define which data fields are mapped to which model parameters gives the author great flexibility in being able to use symbols that the author is comfortable with to define model parameters. For instance, if one of the model parameters represents pressure, the author can name that model parameter "Pressure" or "P" or any other symbol that makes sense to the author. The author can even rename the model parameter which, in one embodiment, might cause the data model binding component 810 to automatically update to allow bindings that were previously to the model parameter of the old name to instead be bound to the model parameter of the new name, thereby preserving the desired bindings. This mechanism for binding also allows binding to be changed declaratively at runtime.

The model parameter 811D is illustrated with an asterisk to emphasize that in this example, the model parameter 811D was not assigned a value by the data-model binding component 810. Accordingly, the model parameter 811D remains an unknown. In other words, the model parameter 811D is not assigned a value.

The modeling component 820 performs a number of functions. First, the modeling component 820 defines analytical relationships 821 between the model parameters 811. The analytical relationships 821 are categorized into three general categories including equations 831, rules 832 and constraints 833. However, the list of solvers is extensible. In one embodiment, for example, one or more simulations may be incorporated as part of the analytical relationships provided a corresponding simulation engine is provided and registered as a solver.

The term "equation" as used herein aligns with the term as it is used in the field of mathematics.

The term "rules" as used herein means a conditional statement where if one or more conditions are satisfied (the conditional or "if" portion of the conditional statement), then one or more actions are to be taken (the consequence or "then" portion of the conditional statement). A rule is applied to the model parameters if one or more model parameters are expressed in the conditional statement, or one or more model parameters are expressed in the consequence statement.

The term "constraint" as used herein means that a restriction is applied to one or more model parameters. For instance, in a city planning model, a particular house element may be restricted to placement on a map location that has a subset of the total possible zoning designations. A bridge element may be restricted to below a certain maximum length, or a certain number of lanes.

An author that is familiar with the model may provide expressions of these equations, rules and constraint that apply to that model. In the case of simulations, the author might provide an appropriate simulation engine that provides the appropriate simulation relationships between model parameters. The modeling component 820 may provide a mechanism for the author to provide a natural symbolic expression for equations, rules and constraints. For example, an author of a thermodynamics related model may simply copy and paste equations from a thermodynamics textbook. The ability to bind model parameters to data fields allows the author to use whatever symbols the author is familiar with (such as the exact symbols used in the author's relied-upon textbooks) or the exact symbols that the author would like to use.

Prior to solving, the modeling component 820 also identifies which of the model parameters are to be solved for (i.e., hereinafter, the "output model variable" if singular, or "output model variables" if plural, or "output model variable(s)" if there could be a single or plural output model variables). The output model variables may be unknown parameters, or they might be known model parameters, where the value of the known model parameter is subject to change in the solve operation. In the example of FIG. 8, after the data-model binding operation, model parameters 811A, 811B and 811C are known, and model parameter 811D is unknown. Accordingly, unknown model parameter 811D might be one of the output model variables. Alternatively or in addition, one or more of the known model parameters 811A, 811B and 811C might also be output model variables. The solver 840 then solves for the output model variable(s), if possible. In one embodiment described hereinafter, the solver 840 is able to solve for a variety of output model variables, even within a single model so long as sufficient input model variables are provided to allow the solve operation to be performed. Input model variables might be, for example, known model parameters whose values are not subject to change during the solve operation. For instance, in FIG. 8, if the model parameters 811A and 811D were input model variables, the solver might instead solve for output model variables 811B and 811C instead. In one embodiment, the solver might output any one of a number of different data types for a single model parameter. For instance, some equation operations (such as addition, subtraction, and the like) apply regardless of the whether the operands are integers, floating point, vectors of the same, or matrices of the same.

In one embodiment, even when the solver 840 cannot solve for a particular output model variable, the solver 840 might still present a partial solution for that output model variable, even if a full solve to the actual numerical result (or whatever the solved-for data type) is not possible. This allows the pipeline to facilitate incremental development by prompting the author as to what information is needed to arrive at a full solve. This also helps to eliminate the distinction between author time and use time, since at least a partial solve is available throughout the various authoring stages. For an abstract example, suppose that the analytics model includes an equation a=b+c+d. Now suppose that a, c and d are output model variables, and b is an input model variable having a known value of 5 (an integer in this case). In the solving process, the solver 840 is only able to solve for one of the output model variables "d", and assign a value of 6 (an integer) to the model parameter called "d", but the solver 840 is not able to solve for "c". Since "a" depends from "c", the model parameter called "a" also remains an unknown and unsolved for. In this case, instead of assigning an integer value to "a", the solver might do a partial solve and output the string value of "c+11" to the model parameter "a". As previously mentioned, this might be especially helpful when a domain expert is authoring an analytics model, and will essentially serve to provide partial information regarding the content of model parameter "a" and will also serve to cue the author that some further model analytics needs to be provided that allow for the "c" model parameter to be solved for. This partial solve result may be output in some fashion in the view composition to allow the domain expert to see the partial result.

The solver 840 is shown in simplified form in FIG. 8. However, the solver 840 may direct the operation of multiple constituent solvers as will be described with respect to FIG. 9. In FIG. 8, the modeling component 820 then makes the model parameters (including the now known and solved-for output model variables) available as output to be provided to the view portion 900 of FIG. 9.

Figure 9:
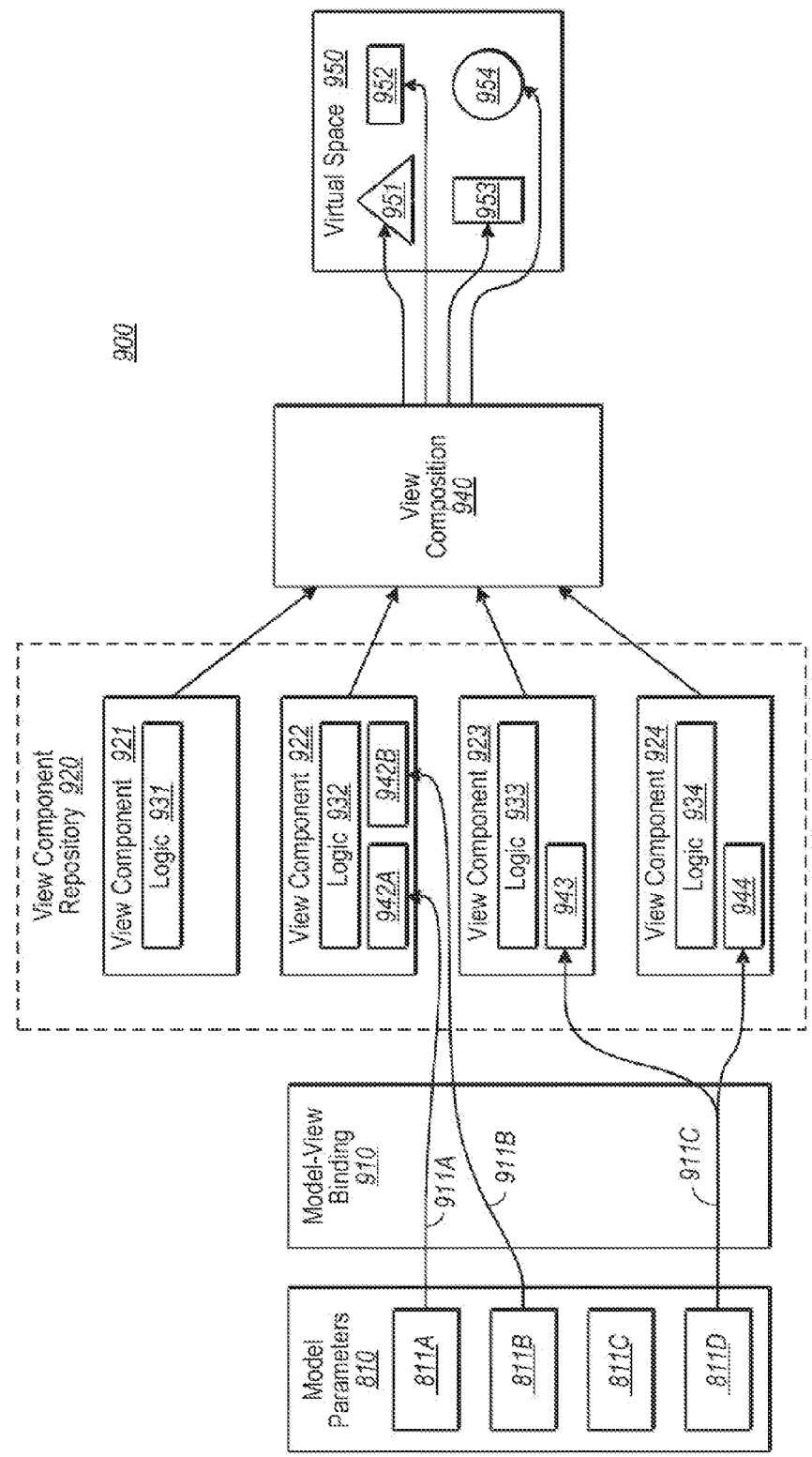
FIG. 9 schematically illustrates an embodiment of the view portion of the pipeline of FIG. 6.

FIG. 9 illustrates a view portion 900 which represents an example of the view portion 630 of FIG. 6, and represents example of visualized controls in the recalculation user interface 200. The view portion 900 receives the model parameters 811 from the analytics portion 800 of FIG. 8. The view portion also includes a view components repository 920 that contains a collection of view components. For example, the view components repository 920 in this example is illustrated as including view components 921 through 924, although the view components repository 920 may contain any number of view components. The view components each may include zero or more input parameters. For example, view component 921 does not include any input parameters. However, view component 922 includes two input parameters 942A and 942B. View component 923 includes one input parameter 943, and view component 924 includes one input parameter 944. That said, this is just an example. The input parameters may, but need not necessary, affect how the visual item is rendered. The fact that the view component 921 does not include any input parameters emphasizes that there can be views that are generated without reference to any model parameters. Consider a view that comprises just fixed (built-in) data that does not change. Such a view might for example constitute reference information for the user. Alternatively, consider a view that just provides a way to browse a catalog, so that items can be selected from it for import into a model.

Each view component 921 through 924 includes or is associated with corresponding logic that, when executed by the view composition component 940 using the corresponding view component input parameter(s), if any, causes a corresponding view item to be placed in virtual space 950. That virtual item may be a static image or object, or may be a dynamic animated virtual item or object For instance, each of view components 921 through 924 are associated with corresponding logic 931 through 934 that, when executed causes the corresponding virtual item 951 through 954, respectively, to be rendered in virtual space 950. The virtual items are illustrated as simple shapes. However, the virtual items may be quite complex in form perhaps even including animation. In this description, when a view item is rendered in virtual space, that means that the view composition component has authored sufficient instructions that, when provided to the rendering engine, the rendering engine is capable if displaying the view item on the display in the designated location and in the designated manner.

The view components 921 through 924 may be provided perhaps even as view data to the view portion 900 using, for example, the authoring component 640 of FIG. 6. For instance, the authoring component 640 might provide a selector that enables the author to select from several geometric forms, or perhaps to compose other geometric forms. The author might also specify the types of input parameters for each view component, whereas some of the input parameters may be default input parameters imposed by the view portion 900. The logic that is associated with each view component 921 through 924 may be provided also a view data, and/or may also include some default functionality provided by the view portion 900 itself.

The view portion 900 includes a model-view binding component 910 that is configured to bind at least some of the model parameters to corresponding input parameters of the view components 921 through 924. For instance, model parameter 811A is bound to the input parameter 942A of view component 922 as represented by arrow 911A. Model parameter 811B is bound to the input parameter 942B of view component 922 as represented by arrow 911B. Also, model parameter 811D is bound to the input parameters 943 and 944 of view components 923 and 924, respectively, as represented by arrow 911C. The model parameter 811C is not shown bound to any corresponding view component parameter, emphasizing that not all model parameters need be used by the view portion of the pipeline, even if those model parameters were essential in the analytics portion. Also, the model parameter 811D is shown bound to two different input parameters of view components representing that the model parameters may be bound to multiple view component parameters. In one embodiment, the definition of the bindings between the model parameters and the view component parameters may be formulated by 1) being explicitly set by the author at authoring time, 2) explicitly set by the user at use time (subject to any restrictions imposed by the author), 3) automatic binding by the authoring component 640 based on algorithmic heuristics, and/or 4) prompting by the authoring component of the author and/or user to specify a binding when it is determined that a binding cannot be made algorithmically.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for compiling a transformation chain of a recalculation user interface, the method being implemented at a computer system that includes one or more processors, the method comprising the computer system, implementing the following:
   an act of assigning each of a plurality of entities to a data canonicalization component based on at least one of a file type or a format type of each of the plurality of entities, wherein the data canonicalization component converts each of the plurality of entities that has one or more particular characteristic into a canonical format;
   an act of determining dependencies between each of the plurality of canonicalized entities based on the transformation chain of the recalculation user interface;
   an act of generating a dependency graph based on the determined dependencies;
   an act of generating a lower level of execution steps based on a data received from the dependency graph, wherein the lower level of execution steps includes a compilation of each transformation in the transformation chain, and wherein the lower level of execution steps also includes at least one dedicated function for each of the dependencies in the dependency graph;
   an act of providing the dependency graph to a runtime for a program; and
   upon a condition in which the runtime detects an event that is listed in the dependency graph, an act of executing the corresponding at least one dedicated function.

2. The method in accordance with claim 1, wherein the dependency graph includes an inter-entity dependency identification from which it can be determined that if a first entity included in the plurality of entities is evaluated, then a second entity also included in the plurality of entities is also to be evaluated.

3. The method in accordance with claim 1, wherein the dependency graph includes a user event dependency from which it can be determined that if a user event occurs, then an entity included in the plurality of entities is evaluated.

4. The method in accordance with claim 1, wherein the recalculation user interface is a spreadsheet document.

5. The method in accordance with claim 1, wherein the recalculation user interface has a complex control that has input parameters to and output parameters from the transformation chain.

6. The method in accordance with claim 1, wherein the transformation chain includes transformations from a data source to a control.

7. The method in accordance with claim 1, wherein the transformation chain includes transformations from a control to another control.

8. The method in accordance with claim 1, wherein the transformation chain is expressed declaratively.

9. The method in accordance with claim 8, wherein the lower level of execution steps are expressed in imperative language code.

10. A computer program product comprising one or more computer-readable hardware storage devices having thereon computer-executable instructions that are executable by one or more processors of a computing system to cause the computing system to compile a transformation chain of a recalculation user interface by at least causing the computing system to implement:
    an act of assigning each of a plurality of entities to a data canonicalization component based on at least one of a file type or a format type of each of the plurality of entities, wherein the data canonicalization component converts each of the plurality of entities that has one or more particular characteristic into a canonical format;
    an act of determining dependencies between each of the plurality of canonicalized entities based on the transformation chain of the recalculation user interface;
    an act of generating a dependency graph based on the determined dependencies;
    an act of generating a lower level of execution steps based on a data received from the dependency graph, wherein the lower level of execution steps includes a compilation of each transformation in the transformation chain, and wherein the lower level of execution steps also includes at least one dedicated function for each of the dependencies in the dependency graph;
    an act of providing the dependency graph to a runtime for a program; and
    upon a condition In which the runtime detects an event that is listed in the dependency graph, an act of executing the corresponding at least one dedicated function.

11. The computer program product in accordance with claim 10, wherein the dependency graph includes an inter-entity dependency identification from which it can be determined that if a first entity included in the plurality of entities is evaluated, then a second entity also included in the plurality of entities is also to be evaluated.

12. The computer program product in accordance with claim 10, wherein the dependency graph represents a dependency between an event and an entity included in the plurality of entities.

13. The computer program product in accordance with claim 12, wherein the event is an evaluation of another entity included in the plurality of entities.

14. The computer program product in accordance with claim 10, wherein the recalculation user interface is a spreadsheet document.

15. The computer program product in accordance with claim 10, wherein the recalculation user interface has a complex control that has input parameters to and output parameters from the transformation.

16. The computer program product in accordance with claim 10, wherein the plurality of entities includes a data sink that is a control.

17. The computer program product in accordance with claim 10, wherein the plurality of entities includes a data source that is a control.

18. The computer program product in accordance with claim 10, wherein the transformation is expressed declaratively.

19. The computer program product in accordance with claim 18, wherein the lower level of execution steps are expressed in imperative language code.

20. A computer system, comprising:
    one or more processors;
    system memory;
    a display device; and
    one or more computer-readable hardware storage devices having stored thereon computer-executable instructions that are executable by the one or more processors to cause the computer system to compile a transformation chain of a recalculation user interface that includes one or more controls, and further to cause the computer system to perform at least the following:

assign each of a plurality of entities to a data canonicalization component based on at least one of a file type or a format type of each of the plurality of entities, wherein the data canonicalization component converts each of the plurality of entities that has one or more particular characteristic into a canonical format;

determine dependencies between each of the plurality of canonicalized entities based on the transformation chain of the recalculation user interface;

generate a dependency graph based on the determined dependencies;

generate a lower level of execution steps based on a data received from the dependency graph, wherein the lower level of execution steps includes a compilation of each transformation in the transformation chain, and wherein the lower level of execution steps also includes at least one dedicated function for each of the dependencies in the dependency graph;

provide the dependency graph to a runtime for a program; and upon a condition in which the runtime detects an event that is listed in the dependency graph, execute the corresponding at least one dedicated function.

21. The computer system in accordance with claim 20, wherein the data canonicalization component is obtained from an external component library.

22. The computer system in accordance with claim 20, wherein the data canonicalization component comprises a collection of components that are each capable of converting an entity that has a particular characteristic into the canonical format.

23. The computer system in accordance with claim 22, wherein a default data canonicalization component included within the collection of components is assigned to a particular entity that does not have a designated data canonicalization component, and wherein the default data canonicalization component uses a default set of rules to attempt to canonicalize the particular entity.

24. The computer system in accordance with claim 23, wherein the computer-executable instructions further cause the computer system to perform the following:

upon a condition in which the default data canonicalization component fails to canonicalize the particular entity, prompt a user of the computer system to provide a schema definition for the particular entity.

* * * * *